(12) United States Patent
Lopitaux et al.

(10) Patent No.: US 8,779,026 B2
(45) Date of Patent: Jul. 15, 2014

(54) TIRE, THE TREAD OF WHICH COMPRISES A RUBBER COMPOSITION A POLYVINYL ESTER RESIN

(75) Inventors: Garance Lopitaux, Valignat (FR); Didier Vasseur, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/638,840

(22) PCT Filed: Mar. 29, 2011

(86) PCT No.: PCT/EP2011/054821
§ 371 (c)(1),
(2), (4) Date: Dec. 12, 2012

(87) PCT Pub. No.: WO2011/120966
PCT Pub. Date: Oct. 6, 2011

(65) Prior Publication Data
US 2013/0203890 A1 Aug. 8, 2013

(30) Foreign Application Priority Data
Mar. 31, 2010 (FR) ...................................... 10 52418

(51) Int. Cl.
*C08J 5/14* (2006.01)
(52) U.S. Cl.
USPC ............................ 523/156; 525/222; 524/524
(58) Field of Classification Search
USPC ............................ 523/156; 524/524; 525/222
See application file for complete search history.

(56) References Cited

U.S. PATENT DOCUMENTS

| 5,837,076 A | 11/1998 | Huber |
| 5,977,239 A * | 11/1999 | Chauffour et al. ............ 524/492 |
| 7,704,552 B2 * | 4/2010 | Okel et al. .................... 427/212 |

FOREIGN PATENT DOCUMENTS

| CN | 101077968 | 11/2007 |
| EP | 0 940 435 | 9/1999 |
| EP | 2 002 993 | 12/2008 |
| FR | 2 923 833 | 5/2009 |

OTHER PUBLICATIONS

Machine translation of FR 2923833.*
Database WPI Week 200834 Thomson 3cientific, London, GB, XP002600273, Nov. 28, 2007.

* cited by examiner

*Primary Examiner* — Nicole M Buie-Hatcher
*Assistant Examiner* — Chelsea M Lowe
(74) *Attorney, Agent, or Firm* — Cozen O'Connor

(57) ABSTRACT

A tire, the tread of which comprises a rubber composition comprising a diene elastomer, such as, for example, an SBR or BR elastomer, a poly(vinyl ester) resin, at a content preferably of between 5 and 50 phr, and a reinforcing filler, such as silica and/or carbon black. The poly(vinyl ester) resin is in particular a vinyl ester homopolymer or copolymer of formula R—C(=O)O—CH=CH2, at least one of the vinyl ester monomers of which comprises a radical R having more than 2 carbon atoms, preferably from 4 to 20 carbon atoms. Such a composition makes it possible to improve the wet grip of the treads of the tire and also the processability of such a composition.

20 Claims, No Drawings

TIRE, THE TREAD OF WHICH COMPRISES A RUBBER COMPOSITION A POLYVINYL ESTER RESIN

RELATED APPLICATIONS

This is a U.S. National Phase Application under 35 USC 371 of International Application PCT/EP2011/054821 filed on Mar. 29, 2011.

This application claims the priority of French application Ser. No. 10/52418 filed Mar. 31, 2010, the content of which is hereby incorporated by reference.

FIELD OF THE INVENTION

The present invention relates to tire treads and to rubber compositions based on diene elastomer and on a resin which can be used for the manufacture of such tire treads.

BACKGROUND OF THE INVENTION

A tire tread has to meet, in a known way, a large number of often conflicting technical requirements, including a low rolling resistance, a high wear resistance and a high wet grip.

It has been possible to improve this compromise in properties, in particular from the viewpoint of the rolling resistance and the wear resistance, in recent years with regard to energy-saving "Green Tires", intended in particular for passenger vehicles, by virtue in particular of the use of novel weakly hysteretic rubber compositions having the characteristic of being reinforced predominantly by specific inorganic fillers described as reinforcing, in particular by highly dispersible silicas (HDS), capable of rivalling, from the viewpoint of the reinforcing power, conventional tire-grade carbon blacks.

However, the improvement in the wet grip properties of tires remains a continual preoccupation of tire designers.

SUMMARY OF THE INVENTION

One object of the invention is to provide a tire, the tread of which comprises a rubber composition comprising at least a diene elastomer and a specific resin which exhibits an improved wet grip.

A first aspect of the invention is directed to a tire, the tread of which comprises a rubber composition comprising at least a diene elastomer, a poly(vinyl ester) resin, the glass transition temperature of which is less than 0° C., and a reinforcing filler.

The tires of the invention are intended in particular to equip motor vehicles of the following types: passenger vehicle, SUV (Sport Utility Vehicle), two-wheel vehicle (in particular motorcycles), aircraft, such as industrial vehicles chosen from vans and heavy-duty vehicles, that is to say underground, bus, heavy road transportation vehicles (lorries, tractors, trailers), off-road vehicles, such as heavy agricultural vehicles or earth moving equipment, or other transportation or handling vehicles.

The invention and its advantages will be easily understood in the light of the description and implementational examples which follow.

I—Measurements and Tests Used

The rubber compositions of the tire treads are characterized before and after curing, as indicated below.

I.1—Mooney Plasticity

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton.meter).

I.2—Tensile Tests

These tests make it possible to determine the elasticity stresses and the properties at break. Unless otherwise indicated, they are carried out in accordance with French Standard NF T 46-002 of September 1988. The nominal secant moduli (or apparent stresses, in MPa) are measured in second elongation (i.e., after an accommodation cycle at the degree of extension anticipated for the measurement itself) at 10% elongation (denoted MA10) and at 100% elongation (denoted MA100). The elongations at break (denoted EB, in %) are also measured. All these tensile measurements are carried out under the standard conditions of temperature (23±2° C.) and hygrometry (50±5% relative humidity), according to French Standard NF T 40-101 (December 1979).

I.3—Shore A Hardness

The Shore A hardness of the compositions after curing is assessed in accordance with Standard ASTM D 2240-86.

I.4—Dynamic Properties

The dynamic properties are measured on a viscosity analyser (Metravib VA4000), according to Standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, during a temperature sweep, is recorded. The value of tan($\delta$) observed at 0° C. (i.e., tan($\delta$)$_{0°\ C.}$) is recorded.

It should be remembered that, in a way well known to a person skilled in the art, the value of tan($\delta$) at 0° C. is representative of the wet grip potential: the higher tan($\delta$) at 0° C., the better the grip.

II—Conditions for Implementing the Invention

The tire according to the invention thus has the essential characteristics that its tread comprises a rubber composition comprising at least a diene elastomer, a poly(vinyl ester) resin and a reinforcing filler, which components are described in detail below.

In the present description, unless expressly indicated otherwise, all the percentages (%) shown are % by weight. Moreover, any interval of values denoted by the expression "between a and b" represents the range of values extending from greater than a to less than b (that is to say, limits a and b excluded), whereas any interval of values denoted by the expression "from a to b" means the range of values extending from a up to b (that is to say, including the strict limits a and b).

II.1—Diene Elastomer

The tread of the tire according to the invention comprises a rubber composition which has the first essential characteristic of comprising at least a diene elastomer.

It should be remembered here that elastomer (or "rubber", the two terms being regarded as synonyms) of the "diene" type should be understood as meaning, in a known way, an (one or more is understood) elastomer resulting at least in part (i.e., a homopolymer or a copolymer) from diene monomers (monomers carrying two carbon-carbon double bonds which may or may not be conjugated).

The diene elastomers can be classified into two categories: "essentially unsaturated" or "essentially saturated". The term "essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content of units of diene origin, always less than 15%). In the category of "essentially unsaturated" diene elastomers, the term "highly unsaturated" diene elastomer is understood to mean in particular a diene elastomer having a content of units of diene origin (conjugated dienes) which is greater than 50%.

Given these definitions, the term diene elastomer capable of being used in the compositions according to the invention is understood more particularly to mean:

(a)—any homopolymer obtained by polymerization of a conjugated diene monomer having from 4 to 12 carbon atoms;
(b)—any copolymer obtained by copolymerization of one or more conjugated dienes with one another or with one or more vinylaromatic compounds having from 8 to 20 carbon atoms;
(c)—a ternary copolymer obtained by copolymerization of ethylene and of an α-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d)—a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystirenes, chlorostirenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol or polysiloxane functional groups having a silanol end (such as described, for example, in FR 2 740 778, U.S. Pat. No. 6,013,718 and WO 2008/141702), of alkoxysilane groups (such as described, for example, in FR 2 765 882 or U.S. Pat. No. 5,977,238), of carboxyl groups (such as described, for example, in WO 01/92402 or U.S. Pat. No. 6,815,473, WO 2004/096865 or US 2006/0089445) or of polyether groups (such as described, for example, in EP 1 127 909, U.S. Pat. No. 6,503,973, WO 2009/000750 and WO 2009/000752). Mention may also be made, as other examples of functionalized elastomers, of the elastomers (such as SBR, BR, NR or IR) of the epoxidized type.

The following are suitable: polybutadienes, in particular those having a content (molar %) of 1,2-units of between 4% and 80% or those having a content (molar %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −60° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene/styrene/isoprene copolymer having a Tg of between −5° C. and −70° C., are suitable in particular.

To sum up, the diene elastomer of the composition is preferably chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/ stirene copolymers (SBIR).

According to a specific embodiment, the composition comprises from 50 to 100 phr of an SBR elastomer, whether an SBR prepared in emulsion ("ESBR") or an SBR prepared in solution ("SSBR").

According to another specific embodiment, the diene elastomer is an SBR/BR blend (mixture).

According to other possible embodiments, the diene elastomer is an SBR/NR (or SBR/IR), BR/NR (or BR/IR) or SBR/BR/NR (or SBR/BR/IR) blend.

In the case of an SBR (ESBR or SSBR) elastomer, use is made in particular of an SBR having a moderate stirene content, for example of between 20% and 35% by weight, or a high stirene content, for example from 35 to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

According to another specific embodiment, the diene elastomer is an isoprene elastomer. The term "isoprene elastomer" is understood to mean, in a known way, an isoprene homopolymer or copolymer, in other words a diene elastomer chosen from the group consisting of natural rubber (NR), which may be plasticized or peptized, synthetic polyisoprenes (IR), the various copolymers of isoprene and the mixtures of these elastomers. Mention will in particular be made, among isoprene copolymers, of isobutene/isoprene copolymers (butyl rubber—IIR), isoprene/stirene copolymers (SIR), isoprene/butadiene copolymers (BIR) or isoprene/butadiene/stirene copolymers (SBIR). This isoprene elastomer is preferably natural rubber or a synthetic cis-1,4-polyisoprene; use is preferably made, among these synthetic polyisoprenes, of the polyisoprenes having a content (molar %) of cis-1,4-bonds of greater than 90%, more preferably still of greater than 98%.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a content (molar %) of cis-1,4-structures preferably of greater than 95%), BIRs, SIRs, SBIRs and the mixtures of these elastomers. The low Tg elastomer preferably comprises butadiene units according to a content (molar %) at least equal to 70%; it preferably consists of a polybutadiene. (BR) exhibiting a content (molar %) of cis-1,4-structures of greater than 90%.

According to another specific embodiment of the invention, the rubber composition comprises, for example, between 30 and 90 phr, in particular between 40 and 90 phr, of a high Tg elastomer as a blend with a low Tg elastomer.

According to another specific embodiment of the invention, the diene elastomer of the composition according to the invention comprises a blend of a BR (as low Tg elastomer) exhibiting a content (molar %) of cis-1,4-structures of greater than 90% with one or more S-SBRs or E-SBRs (as high Tg elastomer(s)).

The compositions can comprise a single diene elastomer or a mixture of several diene elastomers.

II.2—Poly(Vinyl Ester) Resin

The tread of the tire according to the invention comprises at least a poly(vinyl ester) resin, the Tg of which is less than 0° C.

The Tg is measured in a known way by DSC (Differential Scanning calorimetry), according to Standard ASTM D3418 (1999).

The content of poly(vinyl ester) resin is preferably between 5 and 50 phr and more preferably between 10 and 40 phr.

The poly(vinyl ester) resin can be prepared according to any preparation method known to a person skilled in the art, that is to say by bulk polymerization, suspension polymerization, solution polymerization in an organic solvent, or emulsion polymerization. The molecular weight of the poly(vinyl ester) resin can be controlled by any method known to a person skilled in the art, such as the addition of an agent which regulates the chain length, by the concentration of monomer in the reaction medium, by the concentration of radical initiator and by the polymerization temperature.

The poly(vinyl ester) resin can be prepared in particular by esterification of a poly(vinyl alcohol) resin or by transesterification of a poly(vinyl ester) resin; these reactions are generally carried out in solution in a polar or nonpolar solvent, in the presence of an acidic or basic catalyst. It can also be prepared in a known way by solution polymerization of the monomer or monomers used (for example, vinyl hexanoate and vinyl acetate in the following examples) in an organic solvent with a radical initiator.

The poly(vinyl ester) resin can be a homopolymer of a vinyl ester monomer of formula R—C($=$O)O—CH$=$CH$_2$, where R is an alkyl radical having more than 3 carbon atoms, preferably from 4 to 20 carbon atoms.

The poly(vinyl ester) resin can also be a copolymer of several vinyl ester monomers of formula R—C($=$O)O—CH$=$CH$_2$, at least one of the vinyl ester monomers of which comprises an alkyl radical R having more than 3 carbon atoms, preferably from 4 to 20 carbon atoms.

In particular, the vinyl ester monomer derives from propionic, butyric, caproic, 2-ethylhexanoic, octanoic, lauric, pivalic, stearic or linoleic acid. The vinyl ester monomer can also derive from acids branched in the α position with respect to the carboxylic acid functional group and having from 5 to 11 carbon atoms, such as the "VeoVa9®", "VeoVa10®" and "VeoVa11®" monomers deriving from versatic acid (Shell Chemicals). The acids can thus be linear or branched and can optionally have one or more unsaturations.

Thus, according to one embodiment of the invention, the poly(vinyl ester) resin, the Tg of which is less than 0° C., is a homopolymer chosen from the group consisting of poly(vinyl butyrate), poly(vinyl pentanoate), poly(vinyl hexanoate), poly(vinyl 2-ethylhexanoate), poly(vinyl decanoate), poly (vinyl laurate), poly(vinyl dodecanoate), poly(vinyl hexadecanoate), poly(vinyl octanoate), poly(vinyl versatate)s and the mixtures of these homopolymers.

According to another embodiment, the poly(vinyl ester) resin, the Tg of which is less than 0° C., is a poly(vinyl ester) copolymer, chosen from the group consisting of poly(vinyl acetate-co-vinyl hexanoate), poly(vinyl acetate-co-vinyl 2-ethylhexanoate), poly(vinyl acetate-co-vinyl versatate), poly(vinyl acetate-co-vinyl laurate) and the mixtures of these copolymers.

According to a specific embodiment of the invention, the poly(vinyl ester) resin comprises at least a poly(vinyl hexanoate) or a copolymer resulting from at least a vinyl hexanoate monomer, such as, for example, a poly(vinyl acetate-co-vinyl hexanoate).

II.3—Reinforcing Filler

Use may be made of any type of reinforcing filler known for its capabilities of reinforcing a rubber composition which can be used for the manufacture of tires, for example an organic filler, such as carbon black, a reinforcing inorganic filler, such as silica, or a blend of these two types of filler, in particular a blend of carbon black and silica.

All carbon blacks, in particular "tire-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated in an isoprene elastomer in the form of a masterbatch (see, for example, Applications WO 97/36724 and WO 99/16600).

Mention may be made, as examples of organic fillers other than carbon blacks, of the functionalized polyvinyl organic fillers as described in Applications WO-A-2006/069792, WO-A-2006/069793, WO-A-2008/003434 and WO-A-20081003435.

The term "reinforcing inorganic filler" should be understood, in the present patent application, by definition, as meaning any inorganic or mineral filler (whatever its colour and its origin, natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 m$^2$/g, preferably from 30 to 400 m$^2$/g. Mention will be made, as highly dispersible precipitated silicas ("HDS"), for example, of the "Ultrasil" 7000 and "Ultrasil" 7005 silicas from Degussa, the "Zeosil" 1165 MP, 1135 MP and 1115 MP silicas from Rhodia, the "Hi-Sil" EZ150G silica from PPG, the "Zeopol" 8715, 8745 and 8755 silicas from Huber or the silicas with a high specific surface as described in Application WO 03/16837.

The reinforcing inorganic filler used, in particular if it is silica, preferably has a BET surface of between 45 and 400 m$^2$/g, more preferably of between 60 and 300 m$^2$/g.

Preferably, the content of total reinforcing filler (carbon black and/or reinforcing inorganic filler, such as silica) is between 50 and 200 phr and more preferably between 100 and 150 phr.

According to a preferred embodiment of the invention, use is made of a reinforcing filler comprising between 50 and 150 phr, more preferably between 50 and 120 phr, of an inorganic filler, particularly silica, and optionally carbon black; the carbon black, when it is present, is more preferably used at a content lower than 20 phr, more preferably still lower than 10 phr (for example between 0.1 and 10 phr).

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, as described, for example, in Applications WO 03/002648 (or US 2005/016651) and WO 03/002649 (or US 2005/016650).

"Symmetrical" silane polysulphides corresponding to the following general formula (I):

$$Z\text{-}A\text{-}S_x\text{-}A\text{-}Z, \text{ in which:} \tag{I}$$

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

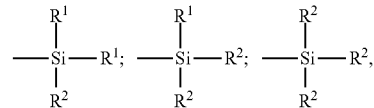

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl), are suitable in particular, without the above definition being limiting.

In the case of a mixture of alkoxysilane polysulphides corresponding to the above formula (I), in particular the usual mixtures available commercially, the mean value of the "x" index is a fractional number preferably of between 2 and 5, more preferably in the vicinity of 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkyl silyl ($C_1$-$C_4$)alkyl)polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula [($C_2H_5O)_3Si(CH_2)_3S_2]_2$, or bis(triethoxysilylpropyl)disulphide, abbreviated to TESPD, of formula [($C_2H_5O)_3Si(CH_2)_3S]_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in Patent Application WO 02/083782 (or US 2004/132880).

Mention will in particular be made, as coupling agent other than alkoxysilane polysuiphide, of bifunctional POSs (polyorganosiloxanes) or of hydroxysilane polysulphides ($R^2$=OH in the above formula VIII), such as described in Patent Applications WO 02/30939 (or U.S. Pat. No. 6,774, 255) and WO 02/31041 (or US 2004/051210), or of silanes or POSs carrying azodicarbonyl functional groups, such as described, for example, in Patent Applications WO 2006/125532, WO 2006/125533 and WO 2006/125534.

In the rubber compositions in accordance with the invention, the content of coupling agent is preferably between 4 and 12 phr and more preferably between 4 and 8 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

II.4—Various Additives

The rubber compositions of the treads of the tires in accordance with the invention can also comprise all or a portion of the usual additives normally used in elastomer compositions intended for the manufacture of treads, such as, for example, pigments, protection agents, such as antiozone waxes, chemical antiozonants, antioxidants, other plasticizing agents and those mentioned above, antifatigue agents, reinforcing resins, methylene acceptors (for example novolac phenolic resin) or donors (for example HMT or H3M), a crosslinking system based either on sulphur, on the one hand, or on sulphur donors and/or peroxide and/or bismaleimides, on the other hand, vulcanization accelerators or vulcanization activators.

These compositions can also comprise, in addition to coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

According to a preferred embodiment, the composition of the tread of the tire according to the invention additionally comprises a plasticizing agent. Preferably, this plasticizing agent is a solid hydrocarbon resin, a liquid plasticizer or a mixture of the two.

The total content of plasticizing agent is preferably greater than 10 phr, more preferably between 10 and 100 phr, in particular between 20 and 80 phr, for example between 20 and 70 phr.

According to a first preferred embodiment of the invention, the plasticizer is a liquid plasticizer at 20° C., referred to as "low Tg" liquid plasticizer, that is to say which, by definition, exhibits a Tg of less than −20° C. and preferably less than −40° C.

Any extending oil, whether of aromatic or nonaromatic nature, any liquid plasticizing agent known for its plasticizing properties with regard to diene elastomers, can be used. At ambient temperature (20° C.), these plasticizers or these oils, which are more or less viscous, are liquid (that is to say, to recapitulate, substances having the ability to assume, in the long run, the shape of their container), in contrast in particular to plasticizing hydrocarbon resins, which are by nature solid at ambient temperature.

The liquid plasticizers chosen from the group consisting of naphthenic oils (of low or high viscosity, in particular hydrogenated or nonhydrogenated), paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulphonate plasticizers and the mixtures of these compounds are particularly suitable.

Mention may be made, as phosphate plasticizers, for example, of those which comprise between 12 and 30 carbon atoms, for example trioctyl phosphate. Mention may in particular be made, as examples of ester plasticizers, of the compounds chosen from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably composed predominantly (for more than 50% by weight, more preferably for more than 80% by weight) of an unsaturated $C_{18}$ fatty acid, that is to say the fatty acid chosen from the group consisting of oleic acid, linoleic acid, linolenic acid and the mixtures of these acids. More preferably, whether of synthetic or natural origin (the case, for example, of sunflower or rapeseed vegetable oils), the fatty acid used is composed, for more than 50% by weight, more preferably still for more than 80% by weight, of oleic acid. Such triesters (trioleates) having a high content of oleic acid are well known; they have been described, for example, in Application WO 02/088238 as plasticizing agents in tire treads.

Preferably, the content of liquid plasticizer is between 5 and 50 phr, more preferably between 10 and 40 phr and more preferably still between 10 and 35 phr.

According to another preferred embodiment of the invention, this plasticizing agent is a thermoplastic hydrocarbon resin, the Tg of which is greater than 0° C., preferably greater than +20° C. This resin is a solid at ambient temperature (23° C.), in contrast to a liquid plasticizing compound, such as an oil.

Preferably, the thermoplastic plasticizing hydrocarbon resin exhibits at least any one of the following characteristics:
- a Tg of greater than 20° C. and more preferably greater than 30° C.;
- a number-average molecular weight (Mn) of between 400 and 2000 g/mol, more preferably between 500 and 1500 g/mol;
- a polydispersity index (PI) of less than 3, more preferably less than 2 (reminder: PI=Mw/Mn, with Mw the weight-average molecular weight).

More preferably, this thermoplastic plasticizing hydrocarbon resin exhibits all of the above preferred characteristics.

The macrostructure (Mw, Mn and PI) of the hydrocarbon resin is determined by steric exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "Waters" columns in series ("STYRAGEL" HR4E, HR1 and HR0.5); detection by differential refractometer ("Waters 2410") and its associated operating software ("Waters Empower").

The thermoplastic hydrocarbon resins can be aliphatic or aromatic or also of the aliphatic/aromatic type, that is to say based on aliphatic and/or aromatic monomers. They can be natural or synthetic, based or not based on petroleum (if such is the case, also known under the name of petroleum resins).

Aromatic monomers which are suitable are, for example, styrene, α-methylstirene, ortho-, meta- or para-methylstirene, vinyltoluene, para-(tert-butyl)stirene, methoxystirenes, chlorostirenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a particularly preferred embodiment, the plasticizing hydrocarbon resin is chosen from the group consisting of cyclopentadiene (abbreviated to CPD) or dicyclopentadiene (abbreviated to DCPD) homopolymer or copolymer resins, terpene homopolymer or copolymer resins, terpene phenol homopolymer or copolymer resins, $C_5$ fraction homopolymer or copolymer resins, $C_9$ fraction homopolymer or copolymer resins, α-methylstirene homopolymer or copolymer resins and the mixtures of these resins, which can be used alone or in combination with a liquid plasticizer, for example an MES or TDAE oil.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Mention will in particular be made, among the above plasticizing hydrocarbon resins, of α-pinene, β-pinene, dipentene or polylimonene homo- or copolymer resins.

The preferred resins above are well known to a person skilled in the art and are commercially available, for example sold, as regards:

polylimonene resins: by DRT under the name "Dercolyte L120" (Mn=625 g/mol; Mw=1010 g/mol; PI=1.6; Tg=72° C.) or by Arizona Chemical Company under the name "Sylvagum TR7125C" (Mn=630 g/mol; Mw=950 g/mol; PI=1.5; Tg=70° C.);

$C_5$ fraction/vinylaromatic copolymer resins, in particular $C_5$ fraction/stirene or $C_5$ fraction/$C_9$ fraction copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", by Exxon under the names "Escorez 2101" and "ECR 373";

limonene/stirene copolymer resins: by DRT under the name "Dercolyte TS 105" and by Arizona Chemical Company under the names "ZT115LT" and "ZT5100".

Mention may also be made, as examples of other preferred resins, of phenol-modified α-methylstirene resins. In order to characterize these phenol-modified resins, it should be remembered that use is made, in a known way, of a number referred to as "hydroxyl number" (measured according to Standard ISO 4326 and expressed in mg KOH/g). α-Methylstirene resins, in particular those modified by phenol, are well known to a person skilled in the art and are commercially available, for example sold by Arizona Chemical Company under the names "Sylvares SA 100" (Mn=660 g/mol; PI=1.5; Tg=53° C.); "Sylvares SA 120" (Mn=1030 g/mol; PI=1.9; Tg=64° C.); "Sylvares 540" (Mn=620 g/mol; PI=1.3; Tg=36° C.; hydroxyl number=56 mg KOH/g); "Silvares 600" (Mn=850 g/mol; PI=1.4; Tg=50° C.; hydroxyl number=31 mg KOH/g).

According to a specific embodiment of the invention, the content of plasticizing hydrocarbon resin is between 5 and 50 phr, preferably between 10 and 40 phr and more preferably still between 10 and 35 phr.

II.5—Preparation of the Rubber Compositions

The rubber compositions can be manufactured in appropriate mixers using two successive preparation phases well known to a person skilled in the art: a first phase of thermomechanical working or kneading ("nonproductive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., finishing phase during which the crosslinking system is incorporated.

The process for preparing such compositions comprises, for example, the following stages:

incorporating in a diene elastomer, during a first stage ("nonproductive" stage), at least a poly(vinyl ester) resin and a reinforcing filler, everything being kneaded thermomechanically (for example in one or more goes) until a maximum temperature of between 110° C. and 190° C. is reached;

cooling the combined mixture to a temperature of less than 100° C.;

subsequently incorporating, during a second stage ("productive" stage), a crosslinking system;

kneading everything up to a maximum temperature of less than 110° C.

By way of example, the nonproductive phase is carried out in a single thermomechanical stage during which, in a first step, all the necessary base constituents (the diene elastomer, the poly(vinyl ester) resin, the reinforcing filler) are introduced into an appropriate mixer, such as a normal internal mixer, followed, in a second step, for example after kneading for one to two minutes, by the other additives, optional additional covering agents for the filler or processing aids, with the exception of the crosslinking system. The total duration of the kneading, in this nonproductive phase, is preferably between 1 and 15 min.

After cooling the mixture thus obtained, the crosslinking system is then incorporated in an external mixer, such as an open mill, maintained at low temperature (for example between 40° C. and 100° C.). The combined mixture is then mixed (productive phase) for a few minutes, for example between 2 and 15 min.

The crosslinking system proper is preferably based on sulphur and on a primary vulcanization accelerator, in particular on an accelerator of the sulphenamide type. Added to this vulcanization system are various known secondary accelerators or vulcanization activators, such as zinc oxide, stearic acid, guanidine derivatives (in particular diphenylguanidine), and the like, incorporated during the first nonproductive phase and/or during the productive phase. The sulphur content is preferably between 0.5 and 3.0 phr and the content of the primary accelerator is preferably between 0.5 and 5.0 phr.

Use may be made, as accelerator (primary or secondary), of any compound capable of acting as accelerator for the vulcanization of diene elastomers in the presence of sulphur, in particular accelerators of the thiazoles type and their derivatives, accelerators of thiurams type, or zinc dithiocarbamates. These accelerators are more preferably chosen from the group consisting of 2-mercaptobenzothiazyl disulphide (abbreviated to "MBTS"), N-cyclohexyl-2-benzothiazole-sulphenamide (abbreviated to "CBS"), N,N-dicyclohexyl-2-benzothiazole-sulphenamide (abbreviated to "DCBS"), N-tert-butyl-2-benzothiazolesulphenamide (abbreviated to "TBBS"), N-tert-butyl-2-benzothiazolesulphenimide (abbreviated to "TBSI"), zinc dibenzyldithiocarbamate (abbreviated to "ZBEC") and the mixtures of these compounds. Preferably, use is made of a primary accelerator of the sulphenamide type.

The final composition thus obtained can subsequently be calendered, for example in the form of a sheet or of a plaque, in particular for laboratory characterization, or else extruded, for example to form a rubber profiled element used in the manufacture of a tread.

The invention relates to the tires described above both in the raw state (that is to say, before curing) and in the cured state (that is to say, after crosslinking or vulcanization).

III—Examples of the Implementation of the Invention

III.1—Preparation of the Compositions

The tests which follow are carried out in the following way: the diene elastomer, the poly(vinyl ester) resin in the case of a composition prepared in accordance with the invention, the reinforcing filler (silica and carbon black) and the various other ingredients, with the exception of the vulcanization system, are successively introduced into an internal mixer (final degree of filling: approximately 70% by volume), the initial vessel temperature of which is approximately 60° C. Thermomechanical working (nonproductive phase) is then carried out in one stage, which lasts in total approximately 3 to 4 min, until a maximum "dropping" temperature of 165° C. is reached.

The mixture thus obtained is recovered and cooled and then sulphur and an accelerator of sulphenamide type are incorporated on a mixer (homofinisher) at 30° C., everything being mixed (productive phase) for an appropriate time (for example between 5 and 12 min).

The compositions thus obtained are subsequently calendered, either in the form of plaques (thickness of 2 to 3 mm) or of fine sheets of rubber, for the measurement of their physical or mechanical properties, or extruded in the form of a tread.

III.2—Tests

These tests demonstrate the improvement, in terms of wet grip, of a tread of a tire according to the invention, in comparison with a control tread.

For this, two rubber compositions were prepared as indicated above, one in accordance with the invention (hereinafter denoted C.2) and one not in accordance (control, hereinafter denoted C.1).

The composition C.1 is a control composition, based on SBR, which can be used in treads of "Green Tires" for passenger vehicles.

The composition C.2 differs from the control composition C.1 by the addition of 30 phr of poly(vinyl ester) resin, the glass transition temperature of which is less than 0° C., a poly(vinyl acetate-co-vinyl hexanoate). The two compositions are characterized by a very high content of reinforcing filler. The compositions C.1 and C.2 additionally comprise a plasticizer mixture comprising a thermoplastic hydrocarbon resin (high Tg $C_5/C_9$ resin) and a liquid plasticizer (sunflower oil).

Their formulations (in phr or parts by weight per hundred parts of elastomer) and their rubber properties have been summarized in tables 1 and 2.

On reading table 2, it is found first of all that the composition C.2 exhibits a slightly lower. Mooney plasticity value than that of the control composition C.1, which testifies to an improvement in the processability of the composition C.2 in the raw state.

It is subsequently noted that the composition C.2 exhibits a level of stiffness (see in particular Shore A hardness and MA10) equivalent to that of the control composition C.1 and an elongation at break equivalent to that of the composition C.1.

Finally the composition C.2 exhibits a value for tan(δ) at 0° C. which is markedly greater than that of the control composition C.1, an indicator for a person skilled in the art of a potential for wet grip of the tire treads which is improved.

TABLE 1

| | Composition No. | |
|---|---|---|
| | C.1 | C.2 |
| SBR (1) | 100 | 100 |
| Poly (vinyl ester) resin (2) | — | 30 |
| Silica (3) | 110 | 110 |
| Carbon black (4) | 4 | 4 |
| Coupling agent (5) | 8.8 | 8.8 |
| Plasticizer (6) | 40 | 40 |
| Stearic acid (7) | 2.0 | 2.0 |
| ZnO (8) | 1.8 | 1.8 |
| Sulphur (9) | 1.3 | 1.3 |
| CBS (10) | 2 | 2 |
| DPG (11) | 2 | 2 |
| Antioxidant (12) | 2 | 2 |

(1) SBR solution (content expressed as dry SBR); 40% of stirene, 12% of 1,2-polybutadiene units and 48% of 1,4-polybutadiene units (Tg = −28° C.);
(2) Poly(vinyl acetate-co-vinyl hexanoate) (Tg = −25° C.), 80 mol % of vinyl hexanoate monomer and 20 mol % of vinyl acetate monomer;
(3) Silica: "Zeosil 1165 MP" from Rhodia, "HD" type - (BET and CTAB: approximately 160 $m^2/g$);
(4) Carbon black: N234 (ASTM grade);
(5) Coupling agent TESTP ("Si69" from Degussa);
(6) Mixture of high Tg $C_5/C_9$ resin ("Escorez" from Exxon) and of oleic sunflower oil ("Lubrirob Tod 1880" from Novance);
(7) Stearin ("Pristerene" from Uniqema);
(8) Zinc oxide (industrial grade - Umicore);
(9) Sulphur;
(10) N-Cyclohexyl-2-benzothiazolesulphenamide (Santocure CBS from Flexsys);
(11) Diphenylguanidine ("Perkacit DPG" from Flexsys);
(12) N-(1,3-Dimethylbutyl)-N-phenyl-para-phenylenediamine (Santoflex 6-PPD from Flexsys).

TABLE 2

| | Composition No. | |
|---|---|---|
| | C.1 | C.2 |
| Mooney | 62 | 57 |
| Shore A | 64 | 62 |
| MA10 | 5.3 | 5.1 |
| MA100 | 1.8 | 1.4 |
| EB | 584 | 577 |
| Tan(δ) at 0° C. | 0.794 | 0.835 |

The invention claimed is:

1. A tire the tread of which comprises a rubber composition comprising at least a diene elastomer, a poly(vinyl ester) resin, the glass transition temperature of which is less than 0° C., and a reinforcing filler.

2. The tire according to claim 1, wherein the diene elastomer is chosen from the group consisting of polybutadienes, synthetic polyisoprenes, natural rubber, butadiene copolymers, isoprene copolymers and the mixtures of these elastomers.

3. The tire according to claim 1, wherein the content of poly(vinyl ester) resin is between 5 and 50 phr.

4. The tire according to claim 3, wherein the content of poly(vinyl ester) resin is between 10 and 40 phr.

5. The tire according to claim 1, wherein the poly(vinyl ester) resin is a homopolymer of a vinyl ester monomer of formula R—C(=O)O—CH=CH2, where R is an alkyl radical having more than 3 carbon atoms.

6. The tire according to claim 5, wherein R is an alkyl radical having from 4 to 20 carbon atoms.

7. The tire according to claim 5, wherein the poly(vinyl ester) resin is a homopolymer chosen from the group consisting of poly(vinyl butyrate), poly(vinyl pentanoate), poly(vinyl hexanoate), poly(vinyl 2-ethylhexanoate), poly(vinyl decanoate), poly(vinyl laurate), poly(vinyl dodecanoate), poly(vinyl hexadecanoate), poly(vinyl octanoate), poly(vinyl versatate)s and the mixtures of these homopolymers.

8. The tire according to claim 1, wherein the poly(vinyl ester) resin is a copolymer of several vinyl ester monomers of formula R—C(=O)O—CH=CH2, at least one of the vinyl ester monomers of which comprises an alkyl radical R having more than 3 carbon atoms.

9. The tire according to claim 8, wherein R comprises from 4 to 20 carbon atoms.

10. The tire according to claim 8 or claim 9, in which the poly(vinyl ester) resin is a poly(vinyl ester) copolymer, chosen from the group consisting of poly(vinyl acetate-co-vinyl hexanoate), poly(vinyl acetate-co-vinyl 2-ethylhexanoate), poly(vinyl acetate-co-vinyl versatate), poly(vinyl acetate-co-vinyl laurate) and the mixtures of these copolymers.

11. The tire according to claim 10, wherein the poly(vinyl ester) resin comprises at least a poly(vinyl hexanoate) or a copolymer resulting from at least a vinyl hexanoate monomer.

12. The tire according to claim 11, wherein the poly(vinyl ester) resin comprises at least a poly(vinyl acetate-co-vinyl hexanoate).

13. Tire according to claim 1, additionally comprising a plasticizing agent.

14. The tire according to claim 13, wherein the content of plasticizing agent is greater than 10 phr.

15. The tire according to claim 13, wherein the plasticizing agent is a thermoplastic hydrocarbon resin, the Tg of which is greater than 0° C.

16. The tire according to claim 15, wherein the thermoplastic hydrocarbon resin is chosen from the group consisting of cyclopentadiene or dicyclopentadiene homopolymer or copolymer resins, terpene homopolymer or copolymer resins, terpene phenol homopolymer or copolymer resins, C5 fraction homopolymer or copolymer resins, C9 fraction homopolymer or copolymer resins, α-methylstirene homopolymer or copolymer resins and the mixtures of these resins.

17. The tire according to claim 13, wherein the plasticizing agent is a liquid plasticizer at 20° C., the glass transition temperature (Tg) of which is less than 20° C.

18. The tire according to claim 17, wherein the liquid plasticizer is chosen from the group consisting of naphthenic oils, paraffinic oils, MES oils, TDAE oils, ester plasticizers, ether plasticizers, phosphate plasticizers, sulphonate plasticizers and the mixtures of these compounds.

19. The tire according to claim 13, comprising a thermoplastic hydrocarbon resin, the glass transition temperature (Tg) of which is less than 20° C., and a liquid plasticizer chosen from the group consisting of naphthenic oils, paraffinic oils, MES oils, TDAE oils, ester plasticizers, ether plasticizers, phosphate plasticizers, sulphonate plasticizers and the mixtures of these compounds.

20. The tire according to claim 1, wherein in which the reinforcing filler comprises carbon black, silica, or carbon black and silica.

* * * * *